Patented Feb. 20, 1951

2,542,937

UNITED STATES PATENT OFFICE 2,542,937

β-NAPHTHYL-(2)-α:α-DIALKYL-β-ALKYL PROPIONALDEHYDES AND CORRESPONDING PROPANOLS

Karl Miescher, Riehen, and Peter Wieland, Basel, Switzerland, assignors to Ciba Pharmaceutical Products, Inc., Summit, N. J.

No Drawing. Application September 6, 1949, Serial No. 114,288. In Switzerland September 28, 1948

6 Claims. (Cl. 260—599)

The present invention relates to new naphthalene derivatives. More particularly, the invention has especial relation to new naphthylalkyl aldehydes and alcohols and derivatives of these compounds.

It is known that naphthyl-(2)-α:α-dialkyl-β-alkyl-propionic acids which contain in 6-position a free or substituted hydroxyl group and their derivatives are characterized by estrogenic activity.

The present invention is directed to a group of compounds which are related to the aforesaid acids, in so far as they may be in part derived therefrom, and which are characterized by the fact that they produce a surprisingly long period of estrus. These new compounds are the β-naphthyl-(2)-α:α-dialkyl-β-alkyl-propionaldehydes and the corresponding propanols. Thus, for example, the period of estrus in the case of β-(6-methoxynaphthyl-2)-α:α-dimethyl-β-ethyl-propionic acid after subcutaneous administration of 1 milligram to castrated female rats amounts to 21 days. The new naphthyl-(2)-propionaldehydes and propanols, and in particular β-(6-methoxynaphthyl-2)-α:α-dimethyl-β-ethyl-propicnaldehyde and the corresponding propyl alcohol, give in the same test a 3 to 4 times longer period of estrus.

Briefly stated, the said new compounds may be prepared by converting β-naphthyl-(2)-α:α-dialkyl-β-alkyl-propionic acids or their derivatives by means of reducing agents into the corresponding naphthyl-(2)-propionaldehydes or propanols and, if desired, converting the latter into their functional derivatives.

The starting materials can also be further substituted, in particular in the 6-position of the naphthalene nucleus, by a free or substituted (etherified or esterified) hydroxyl group.

Acid derivatives which may be employed are, for example, the chlorides, esters, thiol esters, anhydrides, imide halides, imido ethers or diarylamidines. The following β-naphthyl-(2)-α:α-dialkyl-β-alkyl-propionic acids and their functional derivatives are, in particular, applicable as starting materials: β-(6-methoxy-naphthyl-2)-α:α-dimethyl-β-ethyl-propionic acid, β-naphthyl-(2)-α:α-dimethyl-β-ethyl-propionic acid and β-(6-methoxy-naphthyl-2)-α:α-dimethyl-β-methyl-propionic acid.

The reduction of the above mentioned starting materials can be carried out in known manner, in particular by means of catalytically activated or nascent hydrogen. Thus, for example, the acid chlorides can be reduced to the propionaldehydes with hydrogen in the presence of suitable heavy metal catalysts such as palladium-barium sulphate, palladium-carbon and the like. The propanols are moreover obtained in particularly good yields when the carboxylic acids or their derivatives such as esters, acid halides or acid anhydrides are caused to react with a hydride of a light metal or a light metal alloy, primarily lithium aluminum hydride, in the presence of an inert organic solvent such as ether.

The propionaldehydes obtained can, when desired, be converted into their functional derivatives such as acetals or thioacetals. If the compounds obtained possess in the naphthalene nucleus a substituted hydroxyl group this can be converted into the hydroxyl group. Thus, for example, an esterified or etherified hydroxyl group can be hydrolyzed. The compounds with free alcoholic or phenolic hydroxyl groups can also be treated with esterifying or etherifying agents. Thus, for example, alkyl such as methyl, ethyl, propyl or butyl ethers or esters of aliphatic or aromatic acids, as for example acetic acid, propionic acid or benzoic acid can be obtained.

The products of the present invention are intended to find application as therapeutic agents or as intermediate products.

The following examples illustrate the invention, the parts being by weight unless otherwise stated and the relationship of parts by weight to parts by volume being the same as that of the kilogram to the liter:

Example 1

β-(6-methoxynaphthyl-2)-α:α-dimethyl-β-ethyl-propionaldehyde of the formula

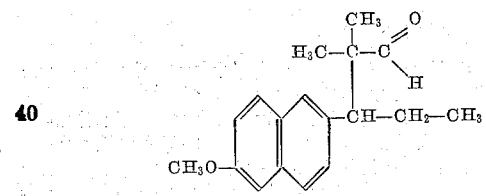

2.25 parts of β-(6-methoxynaphthyl-2)-α:α-dimethyl-β-ethyl-propionic acid are heated with 2.5 parts by volume of oxalyl chloride and 2.5 parts by volume of benzene on the water bath until the gas evolution is complete. Thereupon the whole is evaporated in vacuum to dryness. After taking up the oily residue twice in 20 parts by volume of benzene and evaporating in vacuum, a rapid stream of hydrogen is passed at 90° C. through the solution of the acid chloride in 50 parts by volume of xylene containing 1 part of 10 per cent. palladium-animal charcoal. After 18 minutes the evolution of hydrochloric acid is complete whereupon the product is filtered from catalyst and evaporated in vacuum. For hydrolysis of the unreacted acid chloride the residue is heated with aqueous dioxane for a short time at 80° C. After addition of ether the ethereal solution is washed with dilute sodium carbonate solution and water, dried and evaporated. The oily residue is heated with 4 parts of Girard-Reagent P, 8.08 parts of glacial acetic acid and 80 parts by volume of methanol for 1 hour under reflux. Thereupon the whole is poured into ice water containing 6.4 parts of sodium carbonate. The aqueous solution is extracted by shaking with ether and then treated with concentrated hydrochloric acid. From the acidified solution the β-(6-methoxynaphthyl-2)-α:α-dimethyl-β-ethylpropionaldehyde can be recovered by extraction by shaking with ether. After recrystallization from methanol it melts at 66–67° C. The semi-carbazone melts at 188–189° C.

From a solution of 1.35 parts of β-(6-methoxynaphthyl-2)-α:α-dimethyl-β-ethyl-propionaldehyde, 1 part of ethylene glycol and 0.05 part of para-toluene-sulphonic acid in 50 parts by volume of benzene, benzene is slowly removed by distillation and the volume of the reaction solution kept constant by adding absolute benzene drop by drop. At the end of six hours, 300 parts by volume of benzene have been distilled off. The solution is then cooled and admixed with ether and sodium bicarbonate solution. The organic solution is washed, dried, and evaporated, and the residue distilled in a high vacuum at 160–170° C. When recrystallized from petroleum ether, the resultant acetal melts at 111–112° C.

By heating the above aldehyde for 4 hours to 170–180° C. with the ten-fold quantity of pyridine hydrochloride, the β-(6-hydroxynaphthyl-2)-α:α-dimethyl-β-ethyl-propionaldehyde is obtained. This aldehyde is also produced by starting with the β-(6-hydroxynaphthyl-2)-α:α-dimethyl-β-ethyl-propionic acid instead of the 6-methoxy compound used in this example.

*Example 2*

γ-(6-methoxynaphthyl-2)-β:β-dimethyl-γ-ethylpropyl alcohol of the formula

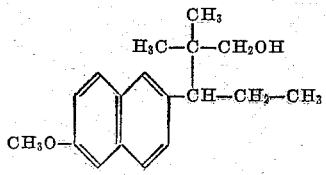

To a solution of 0.19 part lithium aluminum hydride in 20 parts by volume of ether is added drop by drop with stirring, in a stream of nitrogen, a solution of 2.5 parts of β-(6-methoxynaphthyl-2)-α:α-dimethyl-β-ethyl-propionic acid methyl ester in 35 parts by volume of ether. When the addition is complete the whole is stirred for a further 25 minutes at room temperature and then treated with water and 10 parts by volume of 2 N-sulphuric acid. The residue from the ethereal solution washed with water, dried and evaporated, is recrystallized from methanol. The γ-(6-methoxynaphthyl-2)-β:β-dimethyl-γ-ethylpropyl alcohol obtained in this manner melts at 83–84° C.

By allowing 0.2 part of γ-(6-methoxynaphthyl-2)-β:β-dimethyl-γ-ethyl-propyl alcohol to stand for 4 hours at room temperature with 1 part by volume of pyridine and 0.75 part by volume of acetic anhydride, the acetate is obtained. After evaporation under reduced pressure, the last traces of pyridine and acetic anhydride are removed by the addition of xylene followed by evaporation. The acetate is a colorless oil and distills at an oil bath temperature of 170° C. under a pressure of 0.005 mm.

*Example 3*

β-Naphthyl-(2)-α:α-dimethyl-β-ethyl-propionaldehyde of the formula

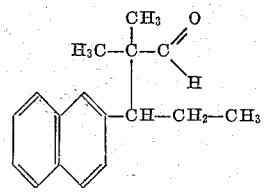

3.6 parts of β-naphthyl-(2)-α:α-dimethyl-β-ethyl-propionic acid are allowed to stand with 4 parts by volume of oxalyl chloride at room temperature until the evolution of gas is complete. Thereupon the whole is heated for a short time on the water bath and evaporated in vacuum. After twice evaporating the residue, each time with 20 parts by volume of benzene, it is dissolved in 50 parts by volume of benzene. Hydrogen is passed through the boiling solution of the acid chloride in benzene in the presence of 1.5 parts of 10 percent. palladium-animal charcoal until the evolution of hydrochloric acid has ceased. Thereupon the catalyst is filtered off and the solution washed with benzene and evaporated in vacuum. The oily residue is boiled under reflux for 1 hour with 4 parts of Girard-Reagent P, 8.08 parts of glacial acetic acid and 80 parts by volume of methanol. The product is then poured into a mixture of ice and water containing 6.4 parts of sodium carbonate and the whole extracted by shaking with ether. The aqueous solution is treated with concentrated hydrochloric acid and extracted with ether. The β-naphthyl-(2)-α:α-dimethyl-β-ethyl-propionaldehyde which is obtained after washing the ethereal solution with sodium bicarbonate solution and water, drying and evaporation distills under 0.25 mm. pressure at 161–162° C.

*Example 4*

γ-Naphthyl-(2)-β:β-dimethyl-γ-ethyl-propyl alcohol of the formula

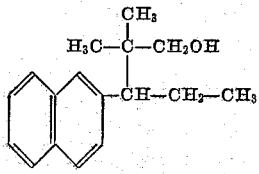

To a solution of 0.43 part of lithium aluminum hydride in 30 parts by volume of ether is added drop by drop with stirring a solution of 5 parts of β-naphthyl-(2)-α:α-dimethyl-β-ethyl-propionic acid ethyl ester in 50 parts by volume of ether. When the addition is complete the whole is stirred for a further 20 minutes at room temperature and then treated with ice and 2 N-sulphuric acid. The residue from the ethereal solution, washed with water, dried and evaporated, is distilled in high vacuum. When recrystallized from petroleum ether, the γ-naphthyl-(2)-β:β-dimethyl-γ-ethyl-propyl alcohol obtained melts at 64–65° C.

In similar manner, β-naphthyl-(2)-propionic acids which are substituted in α- and β-position by higher alkyl residues, or derivatives thereof, such for example as β-naphthyl-(2)-α:α-diethyl- β-propyl-propionic acid, can be reduced into the corresponding alcohols.

Having thus described the invention, what is claimed is:

1. A compound of the formula

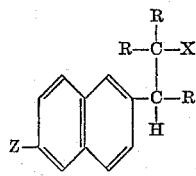

wherein X represents a member of the group consisting of —CHO and —CH₂OH, R stands for a lower alkyl radical and Z is a member of the group consisting of hydrogen, hydroxy and lower alkoxy.

2. The β-(6-methoxynaphthyl-2)-α:α-dimethyl-β-ethyl propionaldehyde of the formula

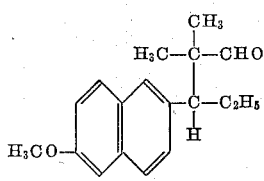

3. The γ-(6-methoxynaphthyl-2)-β:β-dimethyl-γ-ethyl-propanol of the formula

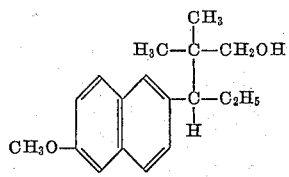

4. The β-naphthyl-(2)-α:α-dimethyl-β-ethyl-propionaldehyde of the formula

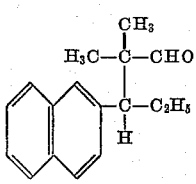

5. The γ-naphthyl-(2)-β:β-dimethyl-γ-ethyl-propanol of the formula

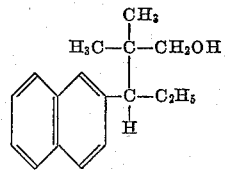

6. The β-(6-hydroxynaphthyl-2)-α:α-dimethyl-β-ethyl-propionaldehyde of the formula

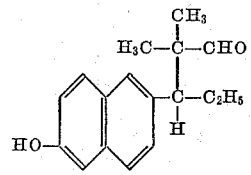

KARL MIESCHER.
PETER WIELAND.

No references cited.